United States Patent
Asai et al.

(10) Patent No.: US 8,760,038 B2
(45) Date of Patent: Jun. 24, 2014

(54) VIBRATION ACTUATOR

(75) Inventors: Shinya Asai, Kariya (JP); Hiroyuki Takei, Kariya (JP); Kazuo Seiki, Kariya (JP); Kitaru Iwata, Kariya (JP); Mikiya Kurita, Kariya (JP); Masaki Takasan, Kariya (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 272 days.

(21) Appl. No.: 13/172,946

(22) Filed: Jun. 30, 2011

(65) Prior Publication Data
US 2012/0001519 A1      Jan. 5, 2012

(30) Foreign Application Priority Data

Jul. 1, 2010    (JP) .................................. 2010-151018

(51) Int. Cl.
*H02N 2/00*         (2006.01)
(52) U.S. Cl.
USPC ................................. 310/323.14; 310/323.09
(58) Field of Classification Search
USPC ............. 310/323.01, 323.02, 323.08, 323.09, 310/323.11, 323.13, 323.14, 323.15, 323.17
See application file for complete search history.

(56) References Cited

U.S. PATENT DOCUMENTS 6,091,179 A *   7/2000   Tobe et al. .................. 310/328
7,705,518 B2 *  4/2010   Kurosawa ................ 310/323.11

FOREIGN PATENT DOCUMENTS

| JP | 7-298650 A | 11/1995 | |
| JP | 2004-236389 A | 8/2004 | |
| JP | 2008-206251 | * 9/2008 | ............... H02N 2/00 |
| JP | 2008-206251 A | 9/2008 | |
| JP | 2009-148138 A | 7/2009 | |
| JP | 2010-016991 A | 1/2010 | |
| WO | 2008/099559 A1 | 8/2008 | |
| WO | 2010/007837 A1 | 1/2010 | |

* cited by examiner

*Primary Examiner* — Thomas Dougherty
(74) *Attorney, Agent, or Firm* — Sughrue Mion, PLLC

(57) ABSTRACT

A vibration actuator includes a roller, a vibrating element having a contact portion that is in contact with the roller, a vibrator for vibrating the vibrating element, a pressing device for pressing the roller against the vibrating element, and a lubricator disposed close to the contact portion and in contact with the roller.

6 Claims, 5 Drawing Sheets

VIBRATION ACTUATOR

BACKGROUND OF THE INVENTION

The present invention relates to a vibration actuator that allows lubrication between the roller and the vibrating element of the actuator.

A vibration actuator using ultrasonic vibration is used as a drive actuator for applications that require a high torque and multiple degrees of freedom. Such vibration actuator includes a vibrator such as a piezoelectric element for generating ultrasonic vibration, a vibrating element held in contact with the vibrator, and a roller disposed in contact with the vibrating element. Part of the vibrating element held in contact with the roller is vibrated by complex vibration caused by ultrasonic vibration of the vibrator, and the roller is rotated by friction against such part of the vibrating element. In such actuator in which the roller is rotated while being in contact with the vibrating element, abrasion occurs between the roller and the vibrating element. Thus, there have been various proposals to reduce such abrasion.

Japanese Unexamined Patent Application Publication No. 2008-206251 discloses a vibration actuator having a spherical shaped roller. In the actuator, the vibrator and the vibrating element are connected to form a generally cylindrical shape, and a cylindrical recess is formed on the side of the vibrating element opposite from the vibrator. The roller is disposed in contact with the edge of the recess. The roller is pressed against the vibrating element by a pressing device that is disposed on the side of the roller opposite from the recess. The pressing device has a recess opening toward the roller and storing therein lubricant such as grease. The recess of the vibrating element also stores therein lubricant such as grease. The pressing device and the vibrating element have lubricant supply passages communicating with the respective recesses for replenishment of lubricant from the outside of the respective pressing device and the vibrating element. Thus, lubrication between the pressing device and the roller is accomplished by the lubricant supplied from the recess of the pressing device, and lubrication between the vibrating element and the roller is accomplished by the lubricant supplied from the recess of the vibrating element.

In the actuator disclosed in the publication No. 2008-206251, however, the lubricant storage recess and the lubricant supply passage formed in the respective pressing device and the vibrating element lead to a complicated structure and hence an increased manufacturing time and cost. When the roller has a cylindrical shape instead of the spherical shape and pressed against the vibrating element by the pressing device disposed inside the roller, the structure of the lubricant storage recess becomes more complicated, thereby further increasing manufacturing cost.

The present invention is directed to providing a vibration actuator that allows easy lubrication between the roller and the vibrating element of the actuator.

SUMMARY OF THE INVENTION

In accordance with an aspect of the present invention, a vibration actuator includes a roller, a vibrating element having a contact portion that is in contact with the roller, a vibrator for vibrating the vibrating element, a pressing device for pressing the roller against the vibrating element, and a lubricator disposed close to the contact portion and in contact with the roller.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
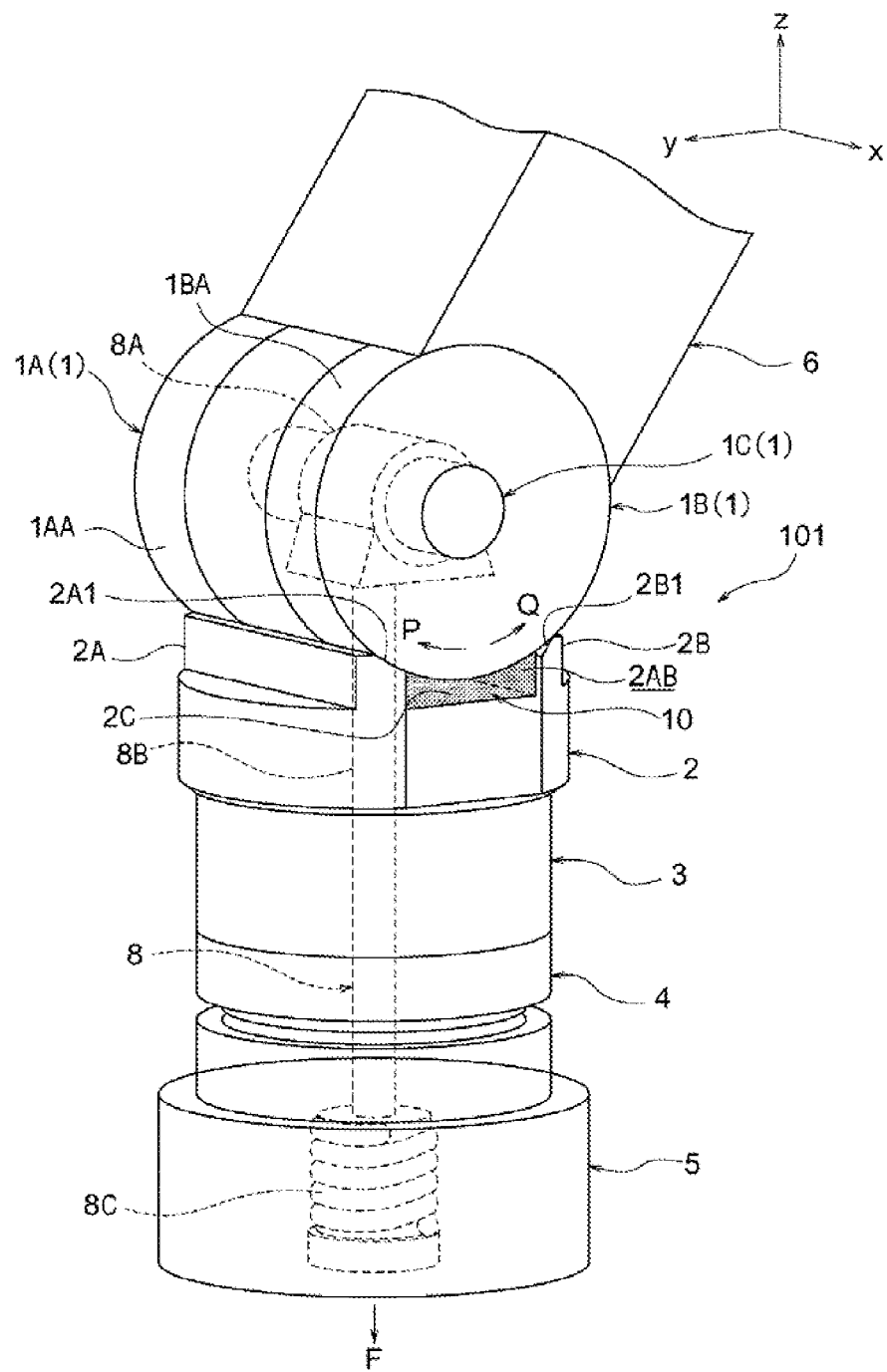
FIG. 1 is a perspective view of a vibration actuator according to a first embodiment of the present invention.

The following will describe the embodiments of the vibration actuator according to the present invention with reference to the accompanying drawings. FIG. 1 shows the first embodiment of the vibration actuator.

Referring to FIG. 1, the vibration actuator designated generally by 101 includes a pair of first and second cylindrical rollers 1A, 1B in facing relation to each other. The first roller 1A and the second roller 1B are fixedly mounted on a roller shaft 1C for rotation therewith. The first roller 1A, the second roller 1B and the roller shaft 1C cooperate to form a roller 1. The first and second rollers 1A, 1B have curved cylindrical surfaces 1AA, 1BA, respectively, to which an arm member 6 of rectangular cross section is mounted. When the first and second rollers 1A, 1B are rotated about the roller shaft 1C in clockwise direction as indicated by arrow P or in counterclockwise direction as indicated by arrow Q, the arm member 6 is also rotated with the first and second rollers 1A, 1B in the same direction.

The vibration actuator 101 includes a generally cylindrical vibrating element 2 disposed in contact with the cylindrical surfaces 1AA, 1BA of the first and second rollers 1A, 1B. The vibrating element 2 has at the end 2C thereof first and second projections 2A, 2B that extend parallel to each other so as to form therebetween a groove 2AB. The edges of the respective first and second projections 2A, 2B adjacent to the groove 2AB are chamfered thereby to form first and second supporting surfaces 2A1, 2B1 (contact portion), respectively. The vibrating element 2 is disposed in contact at the first and second supporting surfaces 2A1, 2B1 of the first and second projections 2A, 2B with the cylindrical surfaces 1AA, 1BA of the first and second rollers 1A, 1B.

The vibration actuator 101 includes a cylindrical piezoelectric element 3 (vibrator) fixedly connected to the end of the vibrating element 2 opposite from the first and second rollers 1A, 1B. The piezoelectric element 3 is composed of a plurality of laminated piezoelectric sheets to which alternating voltage is supplied from a driver circuit (not shown) to generate ultrasonic vibration. A cylindrical base 4 is fixed to the end of the piezoelectric element 3 opposite from the vibrating element 2 and a cylindrical base 5 is fixed to the end of the base 4 opposite from the piezoelectric element 3.

The vibration actuator 101 further includes a pressing device 8 coupled to the roller shaft 1C. The pressing device 8 has a mounting 8A surrounding and rotatably connected to the roller shaft 1C, a rod 8B fixed to the mounting 8A and extending through the vibrating element 2, the piezoelectric element 3 and the base 4, and an urging portion 8C provided in the base 5 and fixed to the end of the rod 8B opposite from the mounting 8A. The urging portion 8C urges the rod 8B and the mounting 8A in the direction indicated by arrow F, so that the first and second rollers 1A, 1B are pressed against the vibrating element 2. The first and second rollers 1A, 1B are held on the vibrating element 2 while being pressed against the vibrating element 2. It is noted that axial direction of the rod 8B of the pressing device 8 extending from the cylindrical base 5 toward the roller shaft 1C corresponds to the positive direction of z-axis, axial direction of the roller shaft 1C extending perpendicular to the z-axis corresponds to the x-axis, and direction extending perpendicular to the x-axis and the z-axis corresponds to the y-axis.

The vibration actuator 101 further includes a generally parallelepiped shaped lubricator 10 disposed in the groove 2AB of the vibrating element 2 and extending in the x-axis. The lubricator 10 is disposed close to and in contact with the first and second projections 2A, 2B of the vibrating element 2. The lubricator 10 is also in contact with the first and second rollers 1A, 1B over the range between the positions adjacent to the respective first and second supporting surfaces 2A1, 2B1, as well as with the end 2C of the vibrating element 2. The part of the first and second rollers 1A, 1B that is in contact with the lubricator 10 does not overlap with the part of the first and second rollers 1A, 1B that is in contact with the first and second supporting surfaces 2A1, 2B1 of the first and second projections 2A, 2B. That is, each of the lubricator 10, the first supporting surface 2A1, the second supporting surface 2B1 is in direct contact with the first and second rollers 1A, 1B.

The lubricator 10 is provided by a flexible and/or elastic porous resin member impregnated with lubricant such as oil and grease. The lubricator 10 is in contact with the first and second rollers 1A, 1B that are pressed against the vibrating element 2, so that the lubricator 10 is deformed in accordance with the profiles of the cylindrical surfaces 1AA, 1BA of the first and second rollers 1A, 1B. The lubricator 10 is held in the groove 2AB of the vibrating element 2 while being deformed by the pressing force of the pressing device 8 against the elastic resilient force of the lubricator 10. The lubricator 10 is thus held in the groove 2AB using the force pressing the first and second rollers 1A, 1B against the vibrating element 2.

The porous resin member of the lubricator 10 has therein continuous pores where lubricant is absorbed and held by capillarity. The cylindrical surfaces 1AA, 1BA of the first and second rollers 1A, 1B are supplied with lubricant that is pumped out from the lubricator 10 by the surface tension due to the contact of the cylindrical surfaces 1AA, 1BA of the first and second rollers 1A, 1B with the lubricator 10.

In the lubricator 10, the resin member with a higher porosity is capable of being impregnated with a larger amount of lubricant, and the resin member having pores with larger size is capable of supplying a larger amount of lubricant. Thus, a material with a high porosity, such as PVA (polyvinyl alcohol) resin having a porosity of more than 90 percent should preferably be used for the resin member of the lubricator 10. Adjustment of the amount of lubricant to be supplied is accomplished by selecting a resin member with the desired porosity. Fluorine type, glycol type, synthetic hydrocarbon or ester type oil and grease may be used for the lubricant.

The following will describe the operation of the vibration actuator 101 with reference to FIG. 1. Referring to FIG. 1, the piezoelectric sheets of the piezoelectric element 3 are supplied with alternating voltage from a driver circuit (not shown) thereby to generate ultrasonic vibration in different directions. Complex vibration caused by the ultrasonic vibration is transmitted to the vibrating element 2, so that elliptical vibration around the x-axis is generated at the ends of the respective first and second projections 2A, 2B of the vibrating element 2. The supporting surfaces 2A1, 2B1 at the ends of the respective first and second projections 2A, 2B where the elliptical vibration around the x-axis and a progressive wave are generated cause the first and second rollers 1A, 1B to rotate in the direction P or Q so as to rub the cylindrical surfaces 1AA, 1BA of the first and second rollers 1A, 1B. As a result, the arm member 6 is pivoted about the roller 1 relative to the vibrating element 2, the piezoelectric element 3 and the bases 4, 5. The rotation direction of the first and second rollers 1A, 1B is changed by controlling the alternating voltage applied to the piezoelectric element 3. Phase control of the ultrasonic vibration of the piezoelectric element 3 is accomplished by controlling the alternating voltage supplied to the piezoelectric element 3, so that antinode of the ultrasonic vibration transmitted from the piezoelectric element 3 to the vibrating element 2, at which amplitude of the ultrasonic vibration is the maximum, occurs in or adjacent to the first and second supporting surfaces 2A1, 2B1 of the first and second projections 2A, 2B of the vibrating element 2. Thus, the ultrasonic vibration generated on the first and second supporting surfaces 2A1, 2B1 in or adjacent to the antinode of the ultrasonic vibration has a large and hence strong amplitude.

The cylindrical surfaces 1AA, 1BA of the first and second rollers 1A, 1B is continuously supplied with lubricant that is pumped by the surface tension due to the contact of the cylindrical surfaces 1AA, 1BA of the first and second rollers 1A, 1B with the lubricator 10 over the range between the first and second supporting surfaces 2A1, 2B1 of the first and second projections 2A, 2B. In this case, the lubricant tends to be collected at positions adjacent to the part of the first and second rollers 1A, 1B where amplitude of the ultrasonic vibration transmitted from the vibrating element 2 is the maximum, specifically, at or adjacent to the part where an antinode of the ultrasonic vibration occurs. This is due to the phenomenon that fluid is collected on the part of the surface of an ultrasonically vibrating element where the amplitude of the ultrasonic vibration is the maximum. Accordingly, the lubricant on the cylindrical surfaces 1AA, 1BA is collected at the portions of the cylindrical surfaces 1AA, 1BA of the first and second rollers 1A, 1B that are in contact with the first and second supporting surfaces 2A1, 2B1 of the vibrating element 2 where an antinode of the vibration occurs, thereby producing a film of lubricant between the cylindrical surfaces 1AA, 1BA and the first and second supporting surfaces 2A1, 2B1. In this way, the contact portions between the vibrating element 2 and the respective first and second rollers 1A, 1B are lubricated. Such lubrication of the contact portion is done as long as the first and second rollers 1A, 1B are subjected to the ultrasonic vibration, regardless of the rotation of the first and second rollers 1A, 1B. This help to prevent abrasion between the vibrating element 2 and the respective first and second rollers 1A, 1B that are rotated while being pressed against the vibrating element 2 by the pressing device 8, thereby increasing the serviceable life of the vibration actuator. Although the lubricant film may be broken by a pressing force developed particularly at a start of the actuator in a conventional actuator, lubricant is immediately supplied by the ultrasonic vibration in the actuator of the present embodiment, resulting in reduced abrasion at a start of the actuator and hence in smooth starting of the actuator.

The force applied from the lubricator 10 to the first and second rollers 1A, 1B during rotation of the first and second rollers 1A, 1B is only to such a strength that allows the deformed lubricator 10 to resume to its original shape by its elastic force. The use of a soft and flexible resin material such as PVA resin for the lubricator 10 helps to reduce friction on the first and second rollers 1A, 1B. The use of lubricant with a higher viscosity for the lubricator 10 helps to prevent the decrease of the coefficient of friction due to the lubricant film between the vibrating element 2 and the first and second rollers 1A, 1B, hence preventing the decrease of the force required for driving the first and second rollers 1A, 1B. The use of lubricant with a higher viscosity also helps to reduce the abrasion between the vibrating element 2 and the first and second rollers 1A, 1B. Thus, lubricant to be used should preferably be of a higher viscosity, for example, ISO VG 180 or more according to the ISO viscosity classification system. In view of that components of the lubricant evaporate easily under the ultrasonic vibration, fluorine type lubricant that is hard to evaporate under such environment is preferable as the lubricant for the actuator of the present embodiment. Supply of such fluorine type lubricant is maintained under high temperature environment.

Although any kind of lubricant may be used for the lubricator 10, the use of fluorine type lubricant helps to prevent the decrease of the force for driving the first and second rollers 1A, 1B, as well as the abrasion between the vibrating element 2 and the first and second rollers 1A, 1B.

Abrasion dust is generated between the vibrating element 2 and the respective first and second rollers 1A, 1B during the rotation of the first and second rollers 1A, 1B. Appropriate adjustment of the amount of lubricant to be supplied from the lubricator 10 to the first and second rollers 1A, 1B prevents such abrasion dust from attaching to the first and second rollers 1A, 1B. Specifically, the pore size of the resin member of the lubricator 10 is determined depending on the hardness and the size of the abrasion dust produced during the rotation of the first and second rollers 1A, 1B. For example, the resin member of the lubricator 10 having pore size of 40 to 130 μm prevents hard and fine abrasion dust from attaching to the first and second rollers 1A, 1B. Further, since the pore size of 40 to 130 μm is sufficiently large for the size of the above abrasion dust, the lubricator 10 having such pore size serves to wipe off the abrasion dust or other fine dust on the cylindrical surfaces 1AA, 1BA of the first and second rollers 1A, 1B with the rotation of the first and second rollers 1A, 1B.

As described above, in the vibration actuator 101 according to the first embodiment, the vibrating element 2 vibrated by the piezoelectric element 3 is in contact at the first and second supporting surfaces 2A1, 2B1 thereof with the roller 1. The roller 1 is pressed against the vibrating element 2 by the pressing device 8. The lubricator 10 is disposed close to the first and second supporting surfaces 2A1, 2B1 of the vibrating element 2 and in contact with the roller 1.

The roller 1 is supplied with lubricant from the lubricator 10 that is disposed close to the first and second supporting surfaces 2A1, 2B1 of the vibrating element 2 and in contact with the roller 1. With the vibration being applied to the roller 1 from the vibrating element 2, the lubricant supplied to the roller 1 at positions thereof adjacent to the first and second supporting surfaces 2A1, 2B1 is collected on the first and second supporting surfaces 2A1, 2B1 of the vibrating element 2 where amplitude of the vibration is the maximum, thereby providing sufficient lubrication between the roller 1 and the respective first and second supporting surfaces 2A1, 2B1 of the vibrating element 2. Thus, lubricant is supplied to the first and second supporting surfaces 2A1, 2B1, regardless of the rotation of the roller 1. The lubricator 10 is merely disposed close to the first and second supporting surfaces 2A1, 2B1 of the vibrating element 2 and in contact with the roller 1, which allows easy lubrication of the contact portion between the roller 1 and the vibrating element 2.

The lubricator 10 is provided by a porous member impregnated with lubricant. The roller 1 is constantly supplied with lubricant that is pumped by the surface tension due to the contact of the roller 1 with the lubricator 10, which results in a simple structure of the lubricator 10. The roller 1 is in contact with the first and second supporting surfaces 2A1, 2B1 of the vibrating element 2 and the lubricator 10 at different positions, and no part of the lubricator 10 is present between the sliding surfaces of the vibrating element 2 and the roller 1. This arrangement of the lubricator 10 results in reduced friction between the rotating roller 1 and the lubricator 10, thereby allowing selection of the material for the lubricator 10 without considering the abrasion strength of the lubricator 10.

The vibrating element 2 has the first and second projections 2A, 2B formed with the first and second supporting surfaces 2A1, 2B1, and the lubricator 10 is in contact with at least part of the first and second projections 2A, 2B. Since the lubricator 10 is disposed adjacent to the first and second projections 2A, 2B, the position where the lubricator 10 is in contact with the roller 1 is close to the first and second supporting surfaces 2A1, 2B1, which allows reliable lubrication of the first and second supporting surfaces 2A1, 2B1 by the lubricator 10. The piezoelectric element 3 is controlled in such a way that antinode of the vibration on the vibrating element 2 occurs in or adjacent to the first and second supporting surfaces 2A1, 2B1 of the vibrating element 2. By doing so, the amplitude of the vibration at the first and second supporting surfaces 2A1, 2B1 becomes large, so that the lubricant supplied from the lubricator 10 to the cylindrical surfaces 1AA, 1BA of the roller 1 is efficiently collected on the first and second supporting surfaces 2A1, 2B1.

The lubricator 10 is provided in the groove 2AB of the vibrating element 2 in contact with both of the roller 1 and the vibrating element 2 and pressed by the roller 1 that is urged by the pressing device 8. Since the lubricator 10 is held in place using the force applied to the roller 1 by the pressing device 8, there is no need to provide additional parts for holding the lubricator 10, resulting in reduced cost and space requirement for the actuator. Since the lubricator 10 is provided in the groove 2AB between the first and second projections 2A, 2B, the arm member 6 is prevented from being brought into contact with the lubricator 10 when the roller 1 is rotated, resulting in increased movement range of the arm member 6 as compared to the case where the lubricator 10 is provided outside the groove 2AB.

Figure 2:
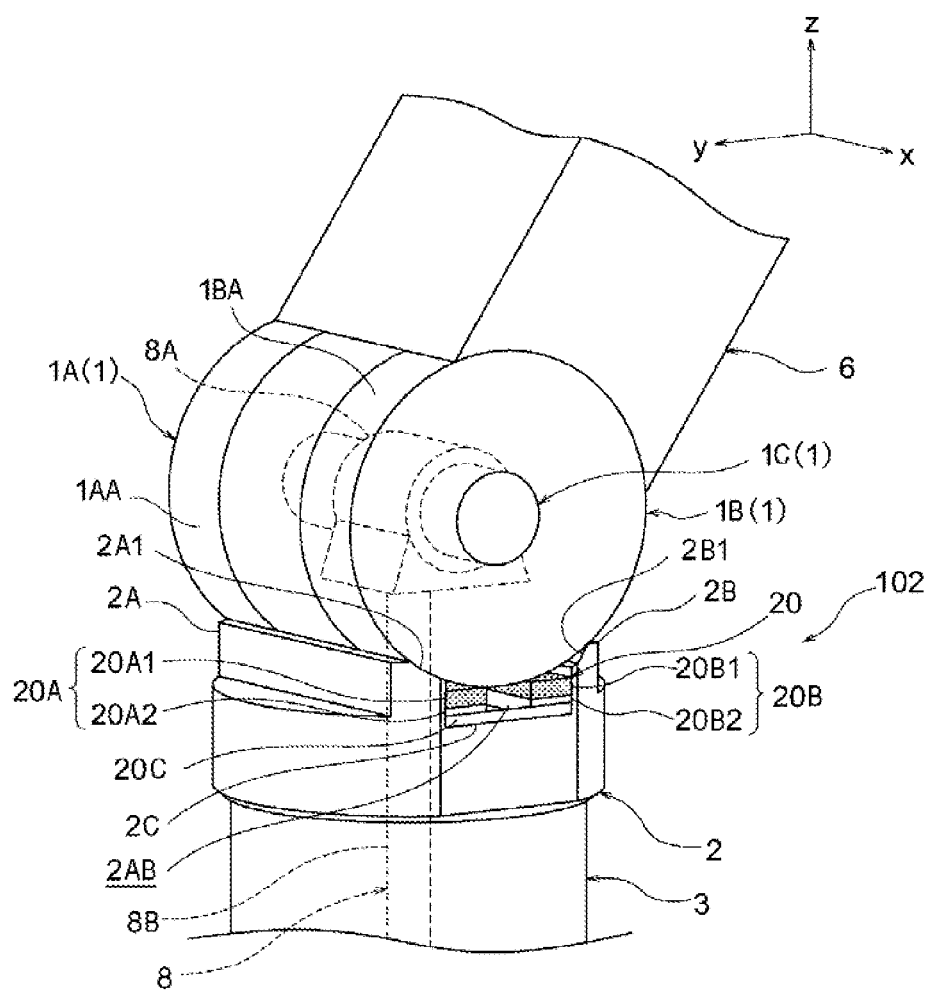
FIG. 2 is a perspective view of a second embodiment of the vibration actuator.

FIG. 2 shows the second embodiment of the vibration actuator according to the present invention. The second embodiment differs from the first embodiment in the structure of the lubricator. In the drawing, same reference numerals are used for the common elements or components in the first and second embodiments, and the description of such elements or components of the second embodiment will be omitted.

As shown in FIG. 2, the vibration actuator designated generally by 102 includes a lubricator 20 that is formed by first and second lubricating members 20A, 20B each having a parallelepiped shape extending in the x-axis. The first and second lubricating members 20A, 20B are located in the groove 2AB of the vibrating element 2 on opposite sides of the rod 8B of the pressing device 8. The first lubricating member 20A is disposed close to and in contact with the first projection 2A of the vibrating element 2, while the second lubricating member 20B is disposed close to and in contact with the second projection 2B of the vibrating element 2.

The first lubricating member 20A has a first resin member 20A1 made of a material similar to that of the lubricator 10 of the first embodiment, and has a first support 20A2 made of a rigid material such as metal. The first resin member 20A1 is disposed on the first support 20A2 on the positive side of the z-axis and in contact with the first and second rollers 1A, 1B at positions adjacent to the first supporting surface 2A1 of the vibrating element 2 while being deformed in accordance with the profile of the cylindrical surfaces 1AA, 1BA of the first and second rollers 1A, 1B. The first support 20A2 is in contact with the end 2C of the vibrating element 2. Similarly, the second lubricating member 20B has a second resin member 20B1 and a second support 20B2. The second resin member 20B1 is disposed in contact with the first and second rollers 1A, 1B at positions adjacent to the second supporting surface 2B1 of the vibrating element 2 while being deformed in accordance with the profile of the cylindrical surfaces 1AA, 1BA of the first and second rollers 1A, 1B. The second support 20B2 is in contact with the end 2C of the vibrating element 2.

The first and second supports 20A2, 20B2 are connected with each other through a connecting member 20C. The first lubricating member 20A, the second lubricating member 20B and the connecting member 20C cooperate to form the lubricator 20. The lubricator 20 is movable in and out of the groove 2AB for replacement by pulling or pushing the connecting portion 20C.

In the vibration actuator 102, the first and second rollers 1A, 1B are supplied with lubricant from the first and second resin members 20A1, 20B1 of the first and second lubricating members 20A, 20B. The lubricant is collected on the first and second supporting surfaces 2A1, 2B1 of the vibrating element 2 due to the ultrasonic vibration of the piezoelectric element 3 transmitted through the vibrating element 2 to the roller 1, thereby allowing sufficient lubrication between the vibrating element 2 and the respective first and second rollers 1A, 1B. Thus, the vibration actuator 102 according to the second embodiment offers the advantages similar to those of the first embodiment.

Figure 3:
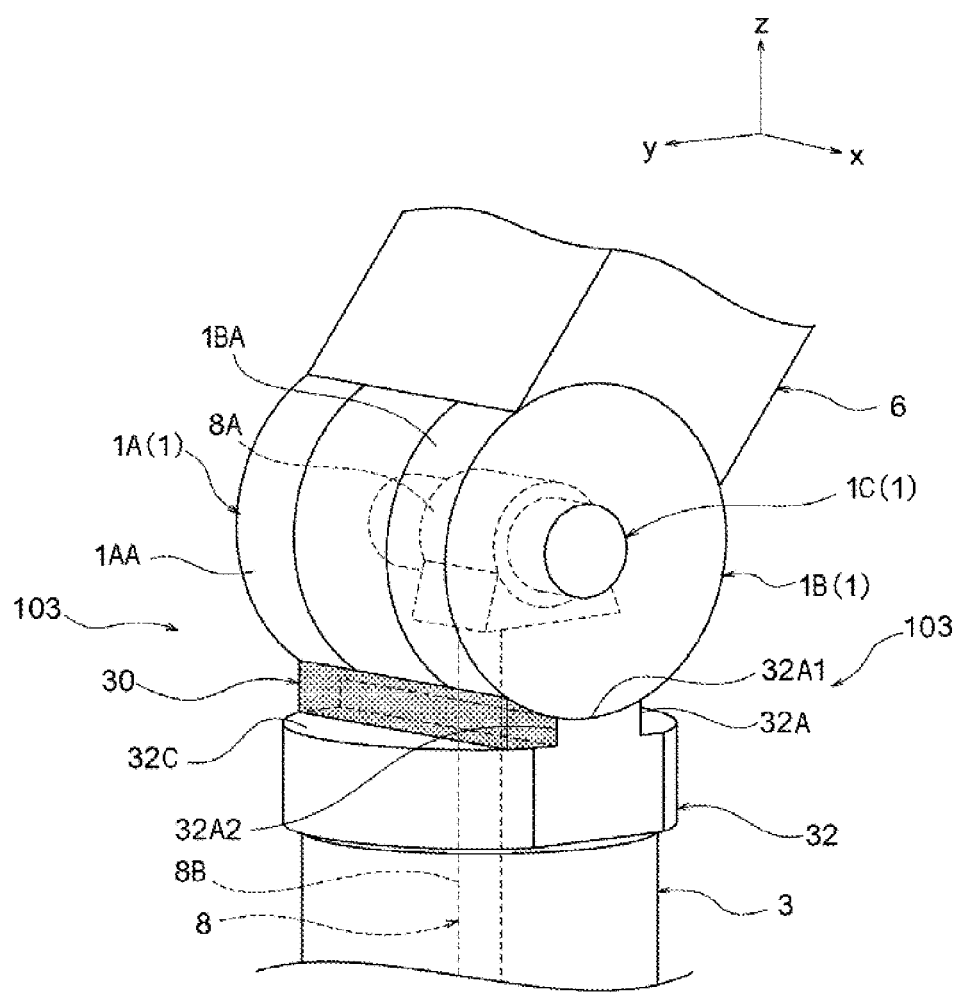
FIG. 3 is a perspective view of a third embodiment of the vibration actuator.

FIG. 3 shows the third embodiment of the vibration actuator according to the present invention. The third embodiment differs from the first embodiment in that a single projection replaces the paired first and second projections 2A, 2B of the vibrating element 2 of the first embodiment. As shown in the drawing, the vibration actuator designated generally by 103 includes a lubricator 30 and a vibrating element 32. Other elements or components are similar to those of the first embodiment, and the description of such elements or components of the third embodiment will be omitted.

The vibrating element 32 has at the center of the end 32C thereof a projection 32A extending in the x-axis. The projection 32A has a supporting surface 32A1 (contact portion) on the positive side of the z-axis, the profile of which corresponds to the profile of the cylindrical surfaces 1AA, 1BA of the first and second rollers 1A, 1B. The first and second rollers 1A, 1B are in contact at the cylindrical surfaces 1AA, 1BA thereof with the supporting surface 32A1.

The lubricator 30 has a trapezoidal cross section extending in the x-axis and is disposed on the end 32C of the vibrating element 32. The lubricator 30 is in contact with the side surface 32A2 of the projection 32A on the positive side of the y-axis and also with the first and second rollers 1A, 1B at positions adjacent to the supporting surface 32A1. The lubricator 30 is made of a material similar to that of the lubricator 10 of the first embodiment, and fixedly mounted to the vibrating element 32. The lubricator 30 is deformed in accordance with the profile of the cylindrical surfaces 1AA, 1BA of the first and second rollers 1A, 1B that are pressed against the vibrating element 32 by the pressing device 8.

In the vibration actuator 103, the first and second rollers 1A, 1B are supplied with lubricant from the lubricator 30. The lubricant is collected on the supporting surface 32A1 of the vibrating element 32 due to the ultrasonic vibration of the piezoelectric element 3 transmitted through the vibrating element 32 to the roller 1, thereby allowing sufficient lubrication between the vibrating element 32 and the respective first and second rollers 1A, 1B. There is no need to provided lubricators on opposite sides of the projection 32A, and lubricant supply between the vibrating element 32 and the first and second rollers 1A, 1B is accomplished by the lubricator 30 provided only on one side of the projection 32A. Thus, the vibration actuator 103 according to the third embodiment offers the advantages similar to those of the first embodiment.

Figure 4:
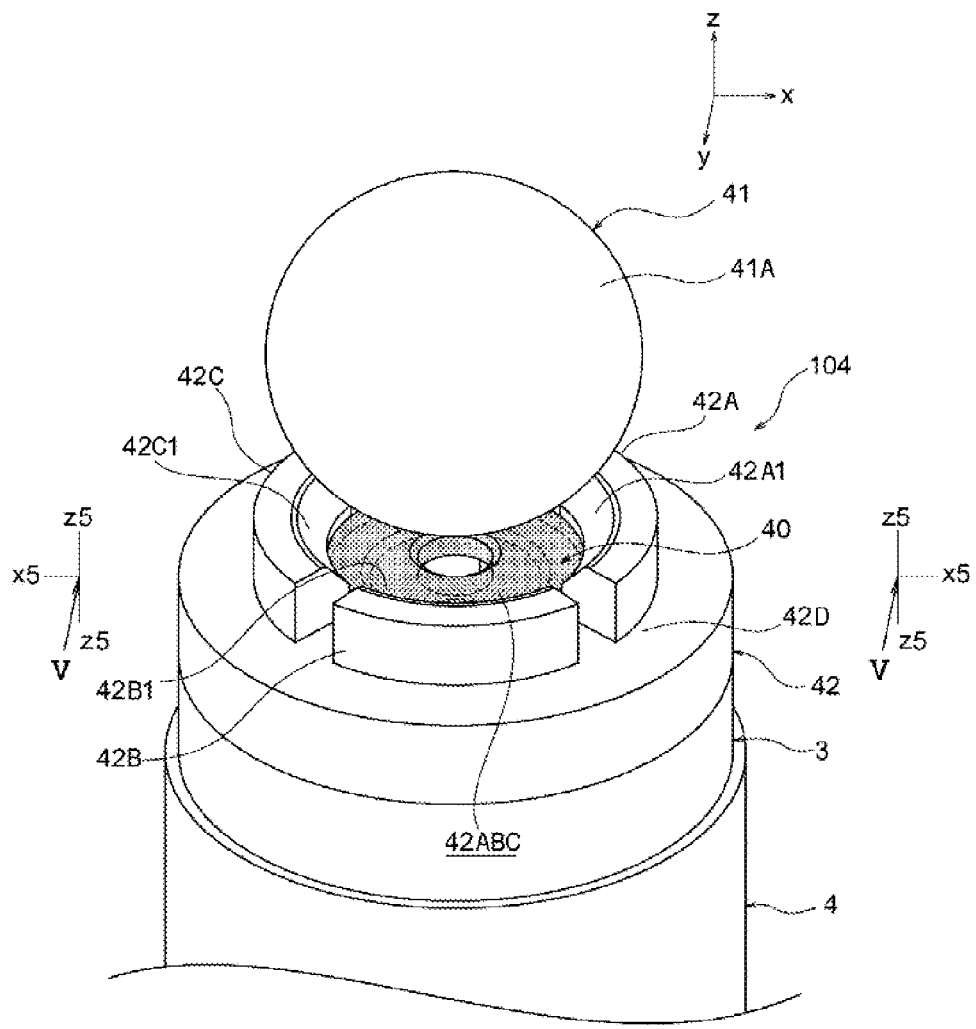
FIG. 4 is a perspective view of a fourth embodiment of the vibration actuator.
Figure 5:
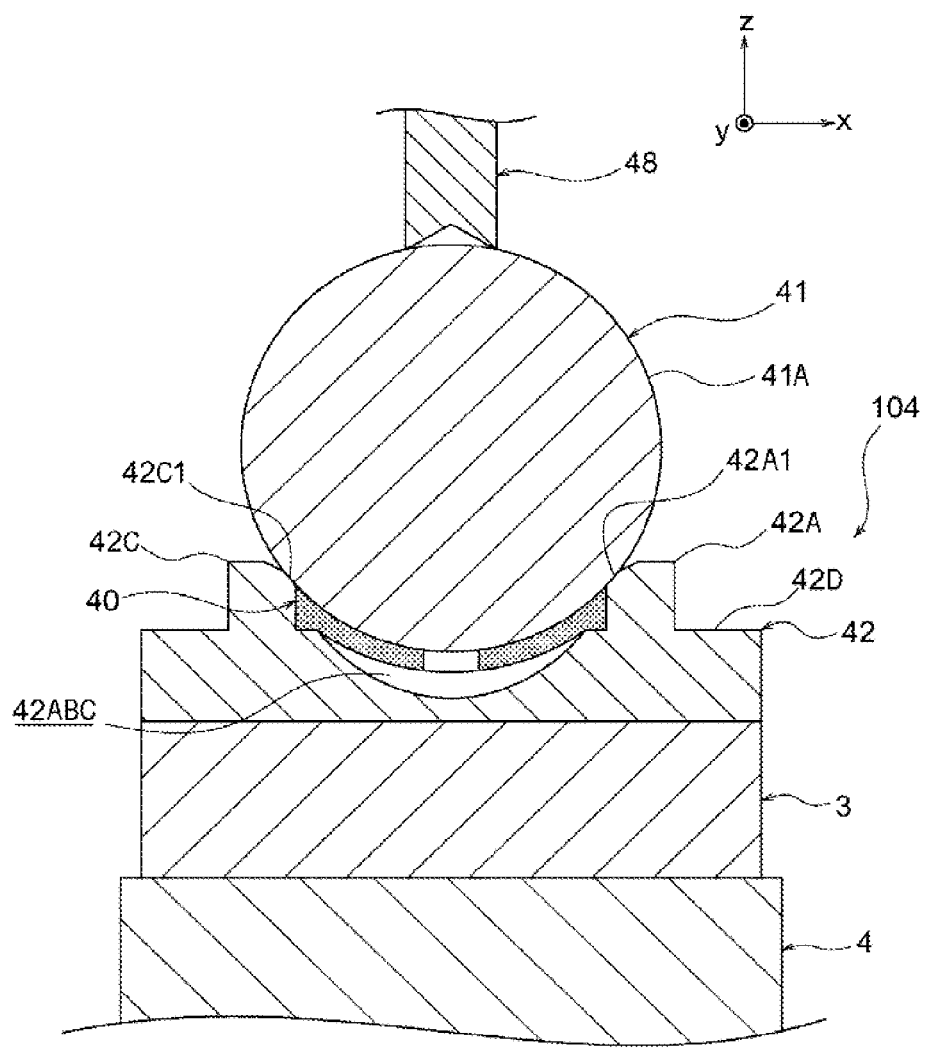
FIG. 5 is a schematic sectional view of the vibration actuator taken along an imaginary plane including the line x5-x5 and the line z5-z5 and seen in the direction of arrow V in FIG. 4.

FIGS. 4 and 5 show the fourth embodiment of the vibration actuator according to the present invention. The fourth embodiment differs from the first embodiment in that the roller has a spherical shape. As shown in the drawings, the vibration actuator designated generally by 104 includes a roller 41, a vibrating element 42, a pressing device 48 and a lubricator 40. Other elements or components are similar to those of the first embodiment, and the description of such elements or components of the fourth embodiment will be omitted.

As shown in FIG. 4, the vibrating element 42 has on the end 42D thereof on the positive side of the z-axis three projections 42A, 42B, 42C each extending in the form of an arc and cooperating to form a generally annular shape. The projections 42A, 42B, 42C have at the radially inner edges thereof on the positive side of the z-axis supporting surfaces 42A1, 42B1, 42C1 (contact portion), respectively.

As shown in FIG. 5, the roller 41 has a spherical shape and is disposed in contact at part of the spherical surface 41A thereof with the supporting surfaces 42A1, 42B1, 42C1 of the projections 42A, 42B, 42C. The pressing device 48 is disposed on the roller 41 located above the vibrator 42 on the positive side of the z-axis. The roller 41 is pressed by the pressing device 48 against the vibrator 42 toward the negative side of the z-axis. When the piezoelectric element 3 is supplied with alternating voltage thereby to generate ultrasonic vibration and complex vibration caused by the ultrasonic vibration is transmitted to the vibrating element 42, the projections 42A, 42B, 42C of the vibrating 42 are vibrated, so that the roller 41 is rotated with multiple degrees of freedom.

As shown in FIG. 4, the lubricator 40 of a ring shape is disposed in the space 42ABC formed by the projections 42A, 42B, 42C on the end 42D of the vibrator 42 and in contact with the projections 42A, 42B, 42C. The lubricator 40 is made of a material similar to that of the lubricator 10 of the first embodiment. The lubricator 40 may be formed by separate portions associated with the respective projections 42A, 42B, 42C.

As shown in FIG. 5, with the roller 41 being pressed against the projections 42A, 42B, 42C of the vibrating element 42 by the pressing device 48, the lubricator 40 is in contact with the roller 41 at the positions close to the respective supporting surfaces 42A1, 42B1, 42C1 and deformed in accordance with the profile of the spherical surface 41A of the roller 41. The lubricator 40 is thus held between the roller 41 and the vibrating element 42.

In the vibration actuator 104, the roller 41 is supplied with lubricant from the lubricator 40. The lubricant is collected on the supporting surfaces 42A1, 42B1, 42C1 of the vibrating element 42 due to the ultrasonic vibration of the piezoelectric element 3 transmitted through the vibrating element 42 to the roller 41, thereby allowing sufficient lubrication between the roller 41 and the vibrating element 42. Thus, the vibration actuator 104 according to the fourth embodiment offers the advantages similar to those of the first embodiment.

Although the lubricator such as 10, 20, 30, 40 in the previous embodiments is disposed close to the projection such as 2A, 2B, 32A, 42A, 42B, 42C of the vibrator such as 2, 32, 42, the lubricator may be spaced apart from the projection as long as lubricant is supplied.

Although in the previous embodiments the lubricator such as 10, 20, 30, 40 is provided separately from the roller such as 1, 41 and also from the vibrator such as 2, 32, 42, the lubricator may be embedded in the cylindrical surfaces 1AA, 1BA of the roller 1 or the spherical surface 41A of the roller 41. Alternatively, the lubricator may be embedded in the first and second supporting surfaces 2A1, 2B1 of the first and second projections 2A, 2B of the vibrating element 2, the supporting surface 32A1 of the projection 32A of the vibrating element 32, or the supporting surfaces 42A1, 42B1, 42C1 of the projections 42A, 42B, 42C of the vibrating element 42. Further alternatively, the cylindrical surfaces 1AA, 1BA of the roller 1, the spherical surface 41A of the roller 41, the first and second projections 2A, 2B of the vibrating element 2, the projection 32A of the vibrating element 32, or the projections 42A, 42B, 42C of the vibrating element 42 may be made of a porous material impregnated with lubricant.

In the previous embodiments, the lubricator such as 10, 20, 30, 40 may be actively vibrated by an additional vibrator. By doing so, the amount of lubricant to be supplied to the roller such as 1, 41 is increased, thereby preventing abrasion on the roller and the vibrating element such as 2, 32, 42, and hence increasing the serviceable life of the vibration actuator such as 101, 102, 103, 104. On the other hand, supplying an increased amount of lubricant to the roller may be accomplished without providing an additional vibrator, but, for example, by driving the piezoelectric element 3 so that a standing wave is generated. Alternatively, the piezoelectric element 3 may be driven so as to generate vibration the strength of which is smaller than the pressing force.

What is claimed is:

1. A vibration actuator, comprising:
   a roller having an outer cylindrical surface;
   a vibrating element having a projection, the projection including a chamfered contact portion that is in contact with the outer cylindrical surface of the roller;
   a vibrator for vibrating the vibrating element;
   a pressing device for pressing the roller against the vibrating element; and
   a lubricator disposed close to the chamfered contact portion and in contact with the outer cylindrical surface of the roller,
   wherein the outer cylindrical surface of the roller is in contact with the lubricator and the chamfered contact portion at different and separate positions,
   wherein the lubricator is provided by a flexible or elastic porous resin member impregnated with lubricant,
   wherein the pressing device urges the outer cylindrical surface of the roller to deform the porous resin member so that a film of lubricant is produced between the outer cylindrical surface of the roller and the chamfered contact portion of the projection.

2. The vibration actuator according to claim 1, wherein the lubricator is in contact with both of the roller and the vibrating element.

3. The vibration actuator according to claim 1, wherein the lubricator is in contact with at least part of the projection.

4. The vibration actuator according to claim 1, wherein the roller has a spherical surface that is in contact with the contact portion.

5. The vibration actuator according to claim 1, wherein the vibrator is controlled in such a way that antinode of the vibration on the vibrating element occurs in or adjacent to the contact portion.

6. The vibration actuator according to claim 1, wherein the roller is supplied with lubricant that is pumped out from the lubricator by surface tension due to contact of the roller with the lubricator.

* * * * *